United States Patent
Blumberg

(10) Patent No.: US 7,536,446 B2
(45) Date of Patent: May 19, 2009

(54) METHOD AND SYSTEM FOR VIEWING SCALABLE DOCUMENTS

(75) Inventor: Robert Blumberg, Santa Clara, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 11/065,355

(22) Filed: Feb. 25, 2005

(65) Prior Publication Data

US 2005/0144256 A1 Jun. 30, 2005

Related U.S. Application Data

(60) Division of application No. 10/263,712, filed on Oct. 4, 2002, now Pat. No. 6,886,034, which is a continuation of application No. 09/267,951, filed on Mar. 11, 1999, now Pat. No. 6,708,309.

(51) Int. Cl.
G06F 15/16 (2006.01)

(52) U.S. Cl. .................. 709/217; 709/203; 709/219; 709/227; 709/228; 715/209; 715/229; 382/298; 382/305

(58) Field of Classification Search ......... 709/200–203, 709/217–219, 227–229; 715/209–210, 243–245, 715/255, 273, 229; 382/298, 305
See application file for complete search history.

(56) References Cited

U.S. PATENT DOCUMENTS

| | | | | |
|---|---|---|---|---|
| 5,774,670 | A | 6/1998 | Montulli | 709/227 |
| 5,968,120 | A | 10/1999 | Guedalia | 345/428 |
| 6,052,692 | A | 4/2000 | Anderson et al. | 345/700 |
| 6,058,417 | A | 5/2000 | Hess et al. | 705/27 |
| 6,073,168 | A | 6/2000 | Mighdoll et al. | 709/217 |
| 6,121,970 | A | 9/2000 | Guedalia | 345/760 |
| 6,167,442 | A | 12/2000 | Sutherland et al. | 709/217 |
| 6,169,998 | B1 | 1/2001 | Iwasaki et al. | 715/530 |
| 6,182,127 | B1 | 1/2001 | Cronin et al. | 709/219 |
| 6,185,610 | B1 | 2/2001 | Nagatomo et al. | 709/219 |
| 6,199,082 | B1 | 3/2001 | Ferrel et al. | 707/552 |
| 6,202,073 | B1 | 3/2001 | Takahashi | 345/620 |
| 6,205,452 | B1 | 3/2001 | Warmus et al. | 707/500 |
| 6,249,353 | B1 | 6/2001 | Yoshida et al. | 358/1.11 |
| 6,321,231 | B1 | 11/2001 | Jebens et al. | 345/428 |
| 6,363,178 | B1 | 3/2002 | Chiba et al. | 358/403 |

(Continued)

OTHER PUBLICATIONS

Author unknown, "Live Picture Image Server Products to be Optimized for Sun's Solaris Operating Environment", Sun Microsystems and Live Picture, Inc. www.sun.com/smi/Press/sunflash/9806/sunflash.

(Continued)

*Primary Examiner*—Bharat N Barot
(74) *Attorney, Agent, or Firm*—Fitzpatrick, Cella Harper & Scinto

(57) ABSTRACT

A method and system for on-line proofing of documents, including the steps of sending by a client computer a document request to a document server computer, transmitting a proof document from the document server computer to the client computer in response to the document request, sending by the client computer an image data request to an image server computer, transmitting image data from the image server computer to the client computer in response to the image data request, and combining the image data with the proof document.

20 Claims, 7 Drawing Sheets

U.S. PATENT DOCUMENTS

| | | | |
|---|---|---|---|
| 6,363,418 B1 | 3/2002 | Conboy et al. | 707/10 |
| 6,434,580 B1 | 8/2002 | Takano et al. | 715/530 |
| 6,449,639 B1 | 9/2002 | Blumberg | 709/217 |
| 6,624,909 B1 | 9/2003 | Czyszczewski et al. | 382/298 |
| 6,647,125 B2 | 11/2003 | Matsumoto et al. | 382/299 |
| 6,687,878 B1 | 2/2004 | Eintracht et al. | 715/512 |
| 6,708,309 B1 * | 3/2004 | Blumberg | 715/209 |
| 6,886,034 B2 * | 4/2005 | Blumberg | 709/217 |

OTHER PUBLICATIONS

Blumberg and Hughes, "Visual Realism and Interactivity for the Internet", 1997, IEEE, pp. 269-273, Live Picture, Inc.

Boliek et al., "Next Generation Image Compression and Manipulation Using CREW", CRC-TR-9728, pp. 1-4, ICIP, '97, Santa Barbara, CA (Oct. 1997).

* cited by examiner

METHOD AND SYSTEM FOR VIEWING SCALABLE DOCUMENTS

This application is a division of application Ser. No. 10/263,712, filed Oct. 4, 2002, which is a continuation of U.S. application Ser. No. 09/267,951, filed Mar. 11, 1999, now U.S. Pat. No. 6,708,309.

This application is related to pending application U.S. Ser. No. 09/221,207, filed on Dec. 23, 1998, entitled "A Method and System for Client-less Viewing of Scalable Documents."

FIELD OF THE INVENTION

The present invention relates to electronic documents containing raster images and to pre-press graphic arts.

BACKGROUND OF THE INVENTION

PostScript is a resolution-independent document format. PostScript fonts can be enlarged or reduced in size to accommodate any viewing resolution. When a viewer zooms in or out of a PostScript document, the text characters automatically scale accordingly. Thus it can be said that PostScript font characters are "scalable."

Similarly, graphical objects based on vector graphics consisting of line segments and curves are also scalable. The line segments and curves can be enlarged or reduced in size by appropriately modifying the pixel coordinates of their control points.

Raster graphics, on the other hand, is not scalable. An image expressed in raster graphics is by its nature pixel resolution specific, and to enlarge or reduce the image involves digital image filtering and interpolation. Moreover, a raster image cannot be stretched beyond its original pixel resolution without introducing additional color data, such as interpolated color data, to the original color data.

In the field of pre-press graphic arts, routinely processed documents contain high resolution raster graphics, with quality levels at or near photographic quality. Such documents are typically stored electronically as very large files, the large size being due primarily to the raster images therewithin. As a result, such documents are unwieldy to process and to transmit. Traditionally pre-press service providers prepared sample proofs of jobs for their customers, and the customers came to the company shops in person to inspect the proofs, before the print productions were ran. Today, however, many pre-press service providers use the Internet as a way to transfer jobs to customers for proofing. This has many advantages. The customer does not have to come to the shop in person. The customer does not have to inspect his job and mark his changes "on the spot." The customer can show his proof to others, and solicit their feedback. Proofs can be sent back and forth between the shop and the customer more often than before.

Use of the Internet for proofing has its shortcomings, though. On account of the large sizes of the files involved, when a customer proofs an electronic pre-press job on-line, there are unacceptable delays in interactively viewing the job, and in transmitting the job back and forth between the pre-press computer and a customer computer.

These delays can be mitigated somewhat by using only low resolution images in the document that is transmitted for proofing, but this is done at the expense of lost quality. A customer proofing a job with low resolution images is not able to inspect the quality of the images—which is one of the main objectives of proofing.

SUMMARY OF THE INVENTION

The present invention overcomes bandwidth limitations for on-line proofing of pre-print jobs by using a new type of document and a new type of client/server architecture. A standard document containing high resolution images is replaced by an image-less document, in which the high resolution images are removed and references to the images are substituted therefor. The high resolution images are stored on an image server, and transmitted using an Internet protocol that interactively transmits relatively small amounts of the image data in response to a customer's interactive viewing of a document. Specifically, the image server transmits image data used to generate a portion of an image at a specific resolution, necessary to display a portion of a page at a specific resolution requested by a customer. As the customer requests to see different portions of the page at different resolutions. The image server transmits additional image data as needed. The customer's client computer caches image data it receives, so that whenever the same image data is needed a second time it is readily available in the client computer.

The present invention also provides an electronic document, including one or more raster images, which is scalable. The raster images are referenced within the document through links. The scalable document of the present invention can be enlarged or reduced to any desired resolution, making the entire document scalable—text characters, graphical objects and raster images.

Regardless of the viewing configuration, a raster image referenced within the scalable document of the present invention can automatically scale according to the viewing resolution. For example, suppose a 6"×8" photograph is converted to a high quality digital image by scanning at 600 dots per inch (dpi). This produces a 3,600×4,800 pixel image, which is embedded into a page of the document.

When such a page is viewed at normal size on a view monitor having 72 dpi resolution, the referenced image is scaled to 432×576 pixels for purposes of display. If a user zooms in by a factor of two, to see a portion of the page containing the image at higher resolution, the referenced image is scaled to 864×1,152 pixels. Thus the dimensions of the image referenced within the document automatically scale to twice their initial values. If the document is printed on a 300 dpi color printer, the referenced image is scaled to 1,800×2,400 pixels in order to produce as high quality a print as possible using the color printer as an output device.

In a preferred embodiment of the present invention an original document is converted to an image-less document by removing the images contained within the original document and replacing them with references. The referenced images arm stored on one or more image servers on the Internet or any other suitable computer network, and may be viewed using client computers. As the image-less document contains references to raster images, rather than the images themselves, the size of the image-less document of the present invention is relatively small.

Upon initial display, the document includes screen-size images. Upon delivery or print, the document will include images scaled to the appropriate device resolution.

Each client computer preferably downloads only that portion of the image data that is necessary for satisfying a user display request, as described hereinbelow. Continuing with the example above, the 3,600×4,800 image in an uncompressed state occupies a total of 51.84 MB (at 3 bytes per pixel). High fidelity compression typically reduces this by an order of magnitude, to roughly 5 MB. Rather than requiring each client to download the entire 5 MB of image data, the present invention downloads that portion of the image data necessary to satisfy the user display request. The user display request is significantly less than the entire image size, since the maximum size image that can be viewed on a video monitor is the full video monitor pixel resolution, which may be 768×1,024 for example. Similarly when saving or printing the document, the user may specify a resolution less than 600 dpi for the save operation, or the printer resolution may be less than 600 dpi, in which case the client only needs to download a portion of the full image data.

The present invention also provides a fragmenting tool for converting standard documents containing high quality images into image-less documents, and a composing tool for converting image-less documents into standard documents. The fragmenting tool is used for creating documents for interactive viewing over a client/server network. The composing tool is used for displaying document pages, or portions of document pages, on a video monitor, for saving documents containing high quality images at user specified resolutions, and for printing such documents at resolutions appropriate to specified output devices.

The present invention is useful in the graphic arts industry for providing efficient on-line proofing capability to customers for pre-press jobs that include high quality images, and overcomes transmission delays prevalent in prior art systems. It is also useful for console management of raster image processing (RIP) print jobs.

There is thus provided in accordance with a preferred embodiment of the present invention a method for on-line proofing of documents, including the steps of sending by a client computer a document request to a document server computer, transmitting a proof document from the document server computer to the client computer in response to the document request, sending by the client computer an image data request to an image server computer, transmitting image data from the image server computer to the client computer in response to the image data request, and combining the image data with the proof document.

There is further provided in accordance with a preferred embodiment of the present invention a system for on-line proofing of documents, including a first transmitter, situated within a client computer, sending a document request to a document server computer and sending an image data request to an image server computer, a second transmitter situated with the server computer transmitting a proof document from the document server computer to the client computer in response to the document request, and transmitting image data from the image server computer in response to the image data request, and a document composer combining the image data with the proof document.

There is still further provided in accordance with a preferred embodiment of the present invention a method for converting a document containing at least one image into a proof document, including extracting at least one image from the document, storing the at least one image as stored image data, and replacing the at least one image by at least one reference to the stored image data.

There is additionally provided in accordance with a preferred embodiment of the present invention a system for converting a document containing at least one image into a proof document, including a document fragmenter extracting at least one image from the document, a storage device for storing the at least one image as stored image data and a reference inserter replacing the at least one image by at least one reference to the stored image data.

There is further provided in accordance with a preferred embodiment of the present invention a method for converting a proof document into a standard document using at least one reference to image data stored on an image server computer, the proof document containing layout information, including the steps of accessing the image data stored on the image server computer in accordance with the at least one reference, producing at least one image, and composing the at least one image with the proof document according to the layout information.

There is still further provided in accordance with a preferred embodiment of the present invention a system for converting a proof document into a standard document using at least one reference to image data stored on an image server computer, the scalable document containing layout information, including a data retriever accessing the image data stored on the image server computer, producing at least one image, and an image composer positioning the at least one image within the proof document according to the layout information.

There is additionally provided in accordance with a preferred embodiment of the present invention a method for viewing documents, including the steps of sending a document request to a document server computer, receiving a proof document from the document server computer in response to the document request, sending an image data request to an image server computer, receiving image data from the image server computer in response to the image data request, and combining the image data with the proof document.

There is yet further provided in accordance with a preferred embodiment of the present invention a system for viewing documents, including a transmitter sending a document request to a document server computer and sending an image data request to an image server computer, a receiver receiving a proof document from the document server computer in response to the document request, and receiving image data from the image server computer in response to the image data request, and a document composer combining the image data with the proof document.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
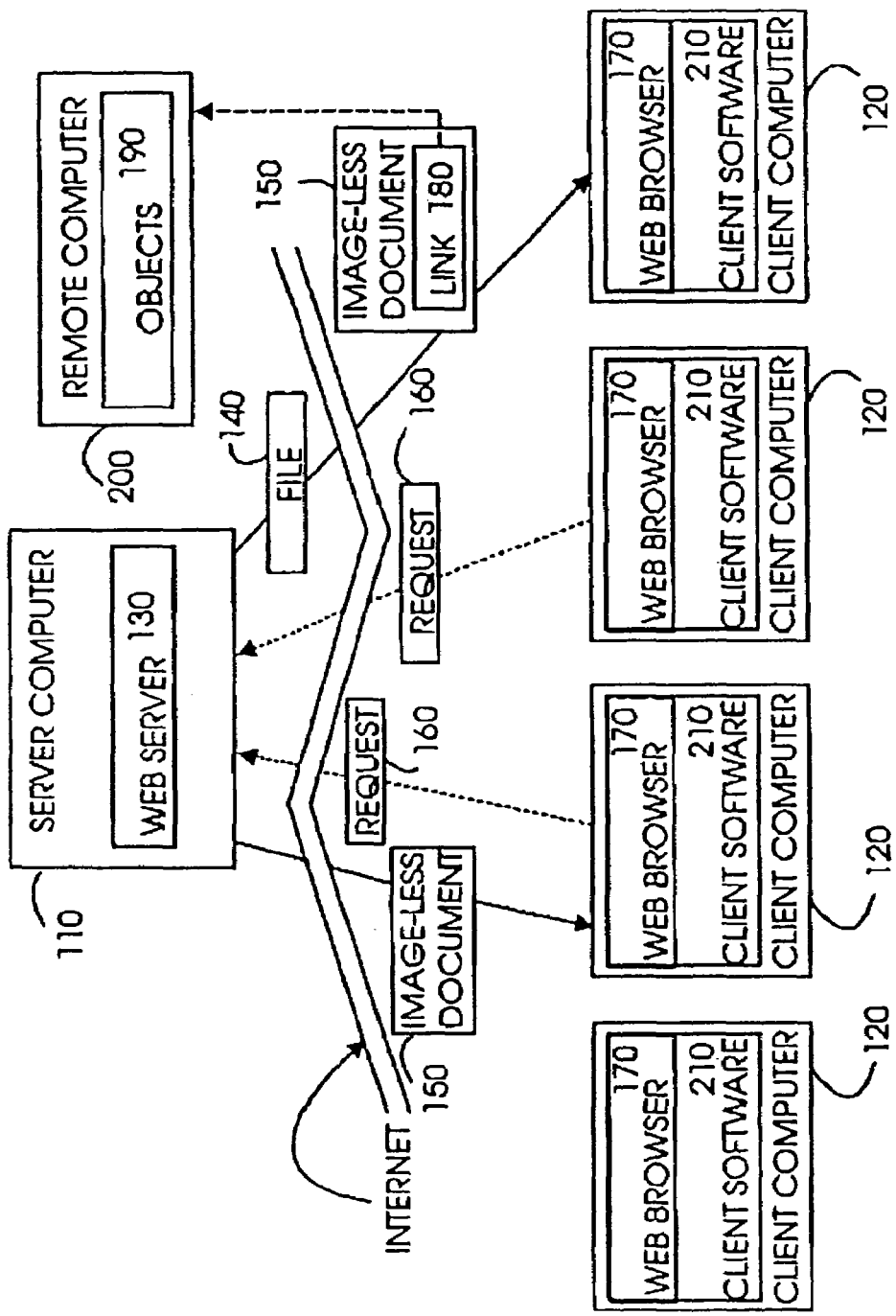
FIG. 1 is a simplified illustration of a network configuration for Internet publishing in which a preferred embodiment of the present invention operates.

The present invention concerns Internet publishing of documents, and provides the capability of storing electronic documents on a web server computer and enabling clients to interactively view, download and print the documents using web browsers. The present invention is useful in the graphic arts industry for providing efficient on-line proofing capability to customers for pre-press jobs that include high quality images, and overcomes transmission delays prevalent in prior art systems. It is also useful for console management of raster image processing (RIP) print jobs.

An example of RIP systems to which the present invention applies is a controller for a color copier. Such a controller typically performs pre-press services, raster image processing and media management. An operator of such a controller uses a console to request a print job sitting in a controller queue, typically for purposes of proofing or modification. The controller typically generates a Portable Document Format (PDF) file and transmits the entire file, which may be very large, to the console. After arriving at the console, document viewer software such as Adobe Acrobat or Adobe Exchange is typically used to render the PDF document and display it. Initially the pages of the PDF document are typically displayed as one or more thumbnail images. The operator subsequently interactively zooms in and out of pages to check quality, align pages for folding, and perform other actions. Modifications are typically written to an Adobe PDF "job ticket," which is sent back to the controller. The PDF file is also send back to the controller if it was modified at the console. The controller applies the modifications and performs raster image processing.

Communication of PDF documents back and forth between the controller and the console is normally slow, primarily because of the large sizes of the document files, due in turn to the high-resolution images contained therewithin. Image-rich documents can be as large as several hundred megabytes.

The present invention can be used to overcome the problem of communication delays between the controller and the console, by breaking up a PDF document into a much smaller image-loss PDF document and a collection of images that can be dynamically inserted into the image-less document at a designated resolution. For image-rich documents that contain high resolution images, such as those commonly used in graphics arts today, the present invention offers marked performance advantages.

An example of a color copier controller to which the present invention can be applied is the Fiery controller of Electronic for Imaging (EFI), Inc.

In a preferred embodiment, the present invention uses resolution-independent paradigms for images, multi-resolution tiled image formats and an Internet imaging protocol for requesting portions of images at desired pixel resolutions, all of which are described hereinbelow.

Internet Publishing

A web browser is software running on a client computer that retrieves data from server computers using the HTTP protocol. A web server is software running on a server computer that delivers requested data to web browsers using the HTTP protocol.

Documents archived on a server computer can be accessed by client computers by means of web browsers. If a document is not in hyper-text markup language (HTML) format, additional server-side or client-side processing may be necessary. Such server-side processing involves auxiliary software on the server for converting each document page requested into HTML format for viewing by the client Client-side processing involves auxiliary software used with the browser, in the form of a plug-in, an Active-X control or a Java applet, for interpreting the non-HTML format.

A widely used non-HTML format for documents is the Portable Document Format (PDF) of Adobe Systems Inc Advantages of PDF documents are their consistent rendering when printed on different output devices, and their non-editable state. A publisher creating a PDF document can be assured that the document will be rendered exactly as he intends, and that the document will not be edited other than by himself. Information about Adobe's PDF document format and its advantages is available on the Internet at http://www.adobe.com/prodindex/postscript/pdf.html.

The present invention, as described hereinbelow, enables applications to interactively view electronic documents, such as PDF documents, located on a document server, by scaling and moving within pages.

Reference is now made to FIG. 1 which is a simplified illustration of a network configuration for Internet publishing in which a preferred embodiment of the present Invention operates. A server computer 110 stores documents for access by multiple client computers 120. Server computer 10 contains a web server 130 for serving files 140 and documents 150 to client computers 120 in response to requests 160. Client computers 120 typically contain web browsers 170 for displaying pages of documents 150, and typically use links 180 in documents 150 to request data from server computer 110.

As will be described hereinbelow, in a preferred embodiment of the present invention, the documents 150 that are transmitted from server computer 110 to client computers 120 are "image-less documents," constructed and operable in accordance with a preferred embodiment of the present invention. Image-less documents are documents generated from original documents, in which some or all of the images from the original document have been removed, and replaced by references thereto. A reference to an image is typically a universal resource locator (URL), that specifies the IP address or domain name of the server on which the image data is stored, along with the directory path and file name of a file that contains the image data.

In a preferred embodiment of the present invention, links 180 of documents 150 point to objects 190, such as raster images, stored on computers 200 connected to the Internet. In a preferred embodiment of the present invention, objects 190 are images that were removed from original documents in generating image-less documents therefrom.

Web browsers 170 typically can display only a limited number of different page formats, such as HTML. In order for a web browser to display a document that is not in one of the supported formats, auxiliary client software 210 can be used to supplement the web browser so that it can interpret the document format, Resolution Independence The present invention uses resolution independent image data requests to achieve scalability of raster images referenced within documents. Resolution independence is a paradigm for processing large digital images based on the tenet that an image can be considered as a continuum of color values distributed over a rectangular spatial region. That is, an image can be considered as a two-dimensional continuous spatial signal, analogous to a one-dimensional continuous time signal. Carrying this analogy further, a continuous "resolution-independent" image can be converted to a discrete spatial array by sampling at appropriate frequencies in each dimension, just as a continuous time signal can be converted to a discrete time signal by sampling at an appropriate rate.

Resolution independent images are modeled by a continuous two dimensional coordinate system with coordinates x and y ranging over a rectangular region that can be normalized as the unit square, $0 \leq x \leq 1$, $0 \leq y \leq 1$. Specifically, a resolution independent image is determined by a vector-valued function $f(x, y)$, with $f(x, y)$ indicating the color value at location $(x, y)$ as x and y range over the unit square. Color is typically prescribed by multiple values within a standard color space, such as RGB or CMYK.

In distributed imaging systems, one of the most common user requests is for access to a rectangular portion of an image. A rectangular portion can be described by a set of four values (t, l, h, w), where (t, l) are the coordinates of the top-left corner of the portion, h is the height of the portion and w is the width of the portion—all four numbers being relative to the normalized unit square. Thus, for example, the portion (0.25, 0.35, 0.15, 0.3) denotes the rectangle extending from top-left corner (0.25, 0.35) to bottom right cornea (0.4, 0.65). The height of this rectangle is 15% of the total height of the image, and its width is 30% of the total width of the image.

Any digital image, no matter how large, does not contain more information than the sum total of its color values. Thus, considering a digital image to be a continuum of color values is an idealization. The extent to which this idealization applies is up to the point where the pixel dimension of the original image is exceeded. For large digital images, this leaves enough room to make the idealization a practical one. This idealization is analogous to the applicability of continuum mechanics to physical bodies up to the point where the atomic level is reached.

Discretization

The present invention involves three types of client requests for documents: (i) interactively displaying and navigating through the document on a video monitor, (ii) printing the document on a local or network printer, and (ii) delivering the document to a client computer; i.e. downloading the document, such as by means of a "Save As" operation. In order to display, print or save a resolution-independent image included within a document, the image must first be converted to a pixel array, which is a raster array of discrete pixel values. The required dimensions of the pixel array determine the sampling frequencies, and as long as these frequencies arc each greater than or equal to one, the conversion can be accomplished without introducing artificial data. Every request for displaying, printing or saving a portion or all of an image can be described by a rectangle in resolution-independent coordinates, as described hereinabove, together with a pair of discrete pixel dimensions representing the width and height of the pixel array. The pixel array can represent a view window for display, a dot array for printing or a raster array for saving a raster image.

Consider, for example, a 6"×8" photograph that is converted to a high quality digital color image by scanning at 600 dots per inch (dpi). This produces a 3,600×4,800 pixel digital image. In order to view this entire image on a video monitor having 72 dpi resolution, the image has to be scaled to 432× 576 pixels, which amounts to a reduction in size of the original image by a factor of 25/3=8.33 in each dimension; that is, the sampling frequency is 8.33 in each dimension. Using the resolution independent paradigm, the digital image is idealized as a resolution independent image, the rectangular portion designating the entire image is (0, 0, 1, 1) and the required view window size is 432×576 pixels.

If this same digital image is to be printed on a 300 dpi resolution color printer, then the relevant rectangular portion is (0, 0, 1, 1) and the required dot array size is 1,800×2,400 pixels. This corresponds to a sampling frequency of 2 in each dimension.

If a user wishes to display the top left quadrant of the image in a 450×600 view window, then the relevant resolution independent portion of the image is (0, 0, 0.5, 0.5) and the required view window size is 450×600 pixels. This corresponds to a sampling frequency of 4 in each dimension. On the other hand, if the user had wanted to save the top left quadrant of the image as a 2,400×3,200 pixel array, this would correspond to a sampling frequency of 2/3in each dimension. In this latter case, the limits of the resolution independent idealization are exceeded, and the uses request cannot be accommodated, unless the image is stretched beyond its original dimensions by adding additional color data, such as interpolated color values, to the original image data.

Image distribution systems that accommodate interactive display, printing and saving (i.e. downloading) can operate by (i) storing large digital images on server computers, (ii) accepting user requests for image data from client computers, each request being determined by a resolution independent rectangular portion and a pixel array size, and (iii) responding to such requests by transmitting appropriate image data from a server to a client. The Flashpix image format and the Internet Imaging Protocol, as described hereinbelow, were designed to make Internet image distribution systems as efficient as possible, by administering a "just enough data" policy and transmitting only the minimal amount of image data necessary to satisfy a client request.

Referring back to the abovementioned example of the 6"×8" photograph, the 3,600×4,800 original image occupies a total of 3×3,600×4,800=51.84 MB uncompressed, at a pixel depth of 3 bytes per pixel. High fidelity compression such as JPEG typically reduces this by an order of magnitude to roughly 5 MB. In the first scenario above, where the user requests the entire image to be displayed at 432×576 pixel resolution, the image to be displayed occupies only 3×432× 576=746,496 bytes uncompressed, which corresponds to approximately 75 KB compressed. Rather than transmit the entire 5 MB of image data from the server to the client, an efficient image distribution system transmits only the 75 KB of data, or slightly more, necessary to render the desired display image.

Flashpix Image Format

Multi-resolution tiled (MRT) image formats are particularly well-suited for storing resolution independent images in such a way that specified rectangular portions of such an image can be efficiently generated at specified pixel resolutions. An MRT format stores the original image together with the successively reduced versions of the image. Moreover the image data for the original image and for each reduced version thereof is partitioned into blocks called tiles. As such, an MRT format is redundant in that the reduced versions of the image can be generated from the original image data but are nevertheless stored in the file. However, the advantage of the MRT format is that lower resolution image data is readily available, and the tile structure makes it simple to access rectangular portions of the image.

FLASHPIX, a trademark of the Digital Imaging Group (DIG), is an example of an MRT image format A Flashpix image is generated by starting with an original image and recursively subsampling it at half of the previous resolution. The recursion continues until the final sub-sampled image is reduced to a size of 64 pixels or less in each dimension Each resolution level is partitioned into image tiles that are 64×64 pixels in size, and the individual tiles can be stored as uncompressed or JPEG compressed image data. A reference for Flashpix is the document "Flashpix Format Specification," © 1996, 1997, Eastman Kodak Company, the contents of which are hereby incorporated by reference.

Referring back to the abovementioned example, the 3,600×4,800 pixel image would be stored as a Flashpix image with eight resolution layers as follows:

| Layer #7: | 3,600 × 4,800 |
|---|---|
| Layer #6: | 1,800 × 2,400 |
| Layer #5: | 900 × 1,200 |
| Layer #4: | 450 × 600 |
| Layer #3: | 225 × 300 |
| Layer #2: | 113 × 150 |
| Layer #1: | 57 × 75 |
| Layer #0: | 29 × 38 |

Each of these layers would be partitioned into a set of tiles, each tire being 64×64 pixels in size.

Figure 2:
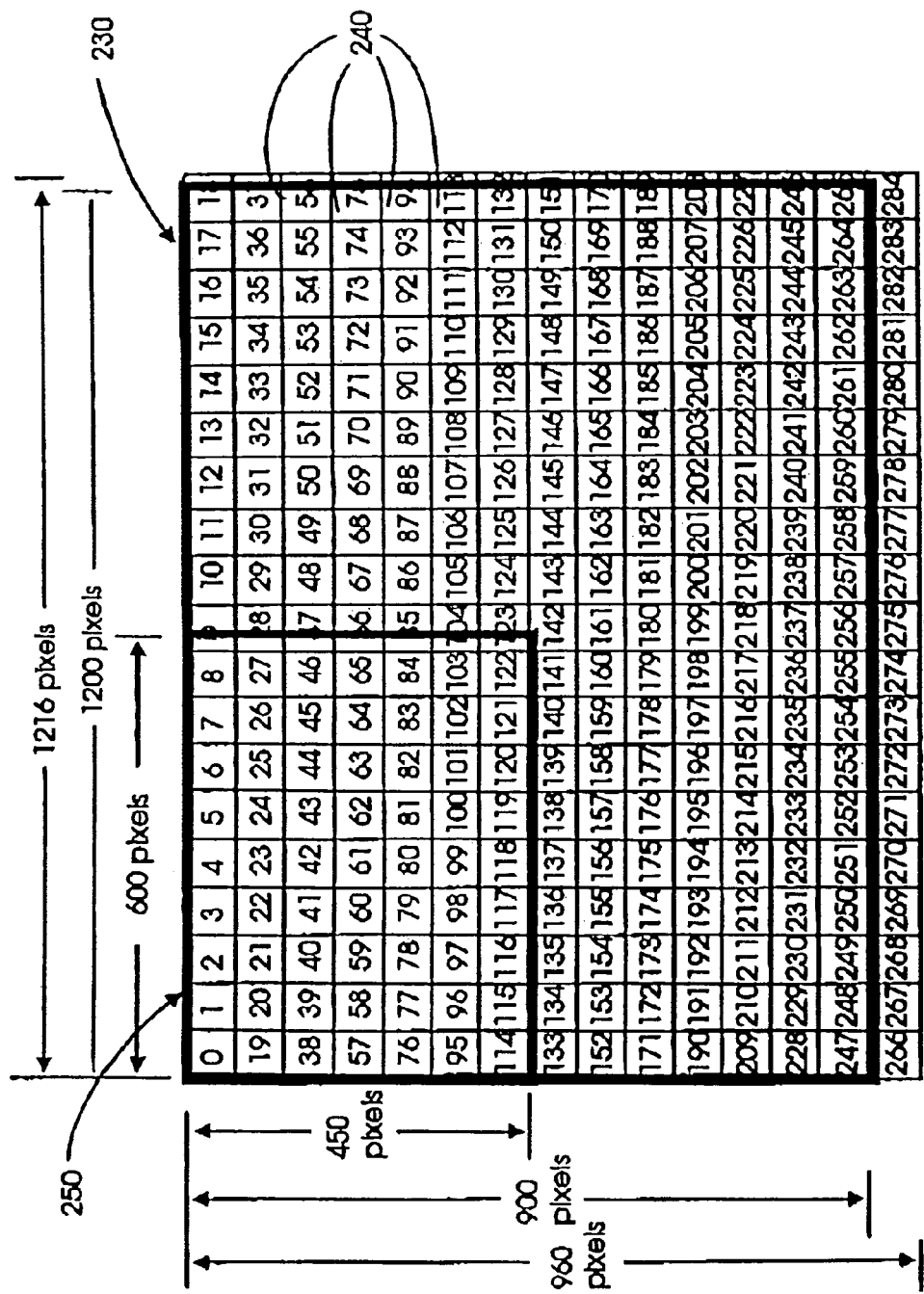
FIG. 2 is an illustration of an image portion and its relationship to tiles in one of the resolution layers of a multi-resolution image, used in connection with a preferred embodiment of the present invention.

Reference is now made to FIG. 2, which is an illustration of a portion of an image and its relationship to tiles in one of the resolution layers, used in connection with a preferred embodiment of the present invention. FIG. 2 illustrates how tiles are identified to satisfy a user request to view the top left quadrant of the above Flashpix image in a viewing window of 240×320 pixels. The requested image portion is (0, 0, 0.5, 0.5), using the notation for resolution independent rectangles described hereinabove, and the requested pixel dimensions are 240×320. This corresponds to a sampling frequency of 7.5 in each dimension.

The closest resolution layer in the Flashpix image that does not exceed this sampling frequency is Layer #5, designated by reference numeral 230, which has a sampling frequency of 4 in each dimension. The requested image portion can be generated by reducing the top left quadrant of the 900×1,200 resolution layer by a factor of 8/15. As illustrated, Layer #5 has 15 rows of tiles, each row having 19 tiles, the tiles being designated by reference numerals 240. Observe that some of the tiles extend beyond the right and bottom borders of the image in Layer #5. To obtain the top left quadrant image portion (0, 0, 0.5, 0.5) designated by reference numeral 250, it is necessary to extract data from the first 10 tiles in each of the top 8 rows of tiles, as these are the tiles that overlap with the image portion (0, 0, 0.5, 0.5). If the tiles are numbered serially from 0 to 284, as illustrated in FIG. 1, then the necessary tiles are 0-9, 19-28, 38-47, 57-66, 76-85, 95-104, 114-123 and 133-142.

These tiles can be retrieved from the Flashpix image and combined into a single image of dimensions 512×640 pixels. The combined image can then be cropped to a size of 450×600 pixels by cutting off the excess tile spillage at the right and bottom borders. The cropped image can be reduced by a factor of 8/15 to the desired target size of 240×320 pixels. This is more efficient than beginning with the full 3,600×4,800 pixel original image and re-sizing by a factor of 2/15.

In the above example, Layer #5 was chosen rather than Layer #4, since the top left quadrant of Layer #4 would have produced an image of 225×300 pixels, which would then have had to be enlarged by a factor of 16/15. Typically it is desirable to avoid enlargements, since they stretch the image beyond its original dimensions and introduce additional color data, such as interpolated color values, to the original image data.

Flashpix image data can be specified in standard RGB or PhotoYCC color spaces, or in another calibrated color space designated by an appropriate International Color Consortium (ICC) profile. The image data may also include an opacity channel to specify transparent and opaque parts of the image by means of opacity values.

In addition to image data, Flashpix files contain meta-data, which is auxiliary data to the image. Meta-data includes information about the image, such as creator, contents, copyright, date and time created, date and time last modified, camera information, scanner information, etc. The meta-data also includes parameters for transformations to be applied to the image, such as rotations and scaling, general affine spatial transformations, contrast adjustment, color space transformations, etc.

Internet Imaging Protocol

A recently developed protocol, the Internet Imaging Protocol (IIP), specifies a method for a user to request portions of an image at a specific resolution. A reference for IIP is the document "Internet Imaging Protocol," @ 1997 Eastman Kodak Company, Hewlett-Packard Company and Live Picture, Inc., the contents of which are hereby incorporated by reference.

A server with server-side software that supports IIP is referred to as an "image server." There are two generic ways to request image data from an image server using IIP; server-side processing of the request, and client-side processing of the request.

To illustrate server-side processing, suppose a user with a viewing window of 480×640 pixels desires to view the full image from the abovementioned example whose original size is 3,600×4,800 pixels. In accordance with IIP, the full image at a 480×640 pixel resolution for an initial view can be requested using the following IIP request, containing a set of IIP commands:

OBJ=iip,1.0&FIF=<image-name>&WID=640&HEI=480&CVT=jpeg.

This request specifies the version of IIP being used by means of the OBJ=iip,1.0 command. It specifies the desired image by means of the FIF command, and specifies the width and height of the viewing window by means of the WID and HEI commands, respectively. The last command, CVT, specifies the format of the image to be sent As indicated above, the CVT command instructs the image server to convert the image data to the JPEG image format. Typically, the JPEG image transmitted from the image server to the client is embedded within an HTML page.

For the image server to process the above IIP request, the server must analyze the original image and generate a JPEG image with the requested specifications, specifically the desired portion and dimensions.

Similarly, the IIP request

OBJ=iip,1.0,&FIF=<image-name>&RGN=0.25,0.35,0.4, 0.6&WID=640&HEI=320&CVT=jpeg specifies the rectangular portion with upper left coordinate at (0.25,0.35), height of 0.4 and width of 0.6, in resolution independent coordinates, and a viewing window of 320 pixels height by 640 pixels width. It also specifies that the designated image portion is to be returned as a single JPEG image.

It can be verified that the requested image portion corresponds to a sampling frequency of 6 in each dimension.

In the above examples the image server does the image processing necessary to create a "ready for display" image for the client web browser. Alternatively, in a client-side processing application, the server can simply send the requested tiles to the client, and leave it up to client software to stitch the tiles together and resize.

To illustrate client-side processing, the IIP request
OBJ=iip,1.0&FIF=<image-name>&TIL=4,0-5 requests the image server to send tiles 0-5 from resolution Layer #4 within the designated image. Referring back to the Flashpix image from the abovementioned example, Layer #4 is the 450×600 version of the image. This version has 8 rows of 10 tiles. Tiles 0-5 within this layer are the first six tiles of the first row.

Tile ranges are interpreted as rectangular ranges of tiles, rather than serial ranges, with the first tile in the range representing the upper left tile in the rectangle, and the second tile in the range representing the lower right tile in the rectangle. Thus, referring back to FIG. 2, the 80 tiles that overlap with the desired image portion (namely, the top left quadrant) can be accessed by the single IIP request:
OBJ=iip,1.0&FIF=<image-name>&TIL=5,0-142.

IIP is independent of any particular image format A CVT request for a desired image portion at desired pixel dimensions and a TIL request for tiles can be applied to any image format. For example, a JPEG image could be the object of a CVT or TIL command. If the image is not already in multi-resolution format, then the server is required to create the appropriate resolution from the original image data on-the-fly in order to process the IIP request. It may be appreciated that the redundancy in storage for a multi-resolution image format such as Flashpix is compensated by a corresponding reduction in the processing necessary to produce these resolutions on-the-fly for a single-resolution image format such as JEG.

Scalable Documents

The present invention also concerns scalable documents—i.e., documents including raster images that are scalable. The raster images are referenced within pages of the document by links. The pages of the scalable documents of the present invention can be enlarged or reduced to a wide range of resolutions, making the entire documents scalable—text characters, graphical objects and raster images. Regardless of the view, print or save parameters, a raster image in a scalable document of the present invention automatically scales according to the desired resolution.

The raster images referenced within the pages of a scalable document can be located on image servers connected to the Internet or any other suitable computer network, viewed interactively, saved on remote computers and printed on network printers. Moreover each client computer accessing the scalable document preferably downloads only the portion of the image data that is necessary for satisfying the user display, print or save request.

The scalable document may also have raster images embedded therewithin in their entirety, and not merely referenced by links. However, the present invention concerns documents that include raster images that are referenced but not stored therewithin.

Storage of references to raster images rather than the images themselves within a document achieves two advantages. The first advantage is that it significantly reduces the size of the document, since raster images tend to be large data structures. This makes it possible for a user to quickly download all or parts of the document without the images. The user can interact with the document, such as by advancing pages or clicking on links, before the image data is downloaded.

The second advantage of storing references rather than raster images is that it provides for scalability; i.e. it provides an efficient way to automatically scale the raster image according to a desired display or print resolution. Considering the abovementioned example of a document containing an image that was scanned at 3,600×4,800 pixel dimensions, the original image is stored on an image server as an approximately 5 MB file, and not within the document. The document references the original image by means of a link.

If a user interactively displays the document on a video monitor, he cannot typically display the image contained therewithin at the full 3,600×4,800 pixel dimensions, as video monitors do not support pixel arrays this large. The display resolution depends on the resolution of the video monitor, the portion of the image being viewed and the portion of the video monitor on which the image is being viewed. For example, if the user is currently viewing the top left quadrant of the image in a viewing window of 240×320 pixel dimensions, and if the original image was scanned at 600 dpi, as above, then the current view corresponds to a display resolution of 160 dpi, only 26.7% of the original resolution.

Moreover a viewing window of 240×320 only requires 230.4 KB of uncompressed image data (at a color depth of three bytes per pixel), which is approximately 23 KB of compressed image data, using the 10:1 ratio for high quality compression recited above. Using the present invention, only the 23 KB of image data necessary to render the desired display is downloaded. Moreover, as described hereinbelow, once this data is downloaded it is cached for subsequent use, so that whenever the same data is required again, it is not necessary to download it from the image server.

Figure 3:
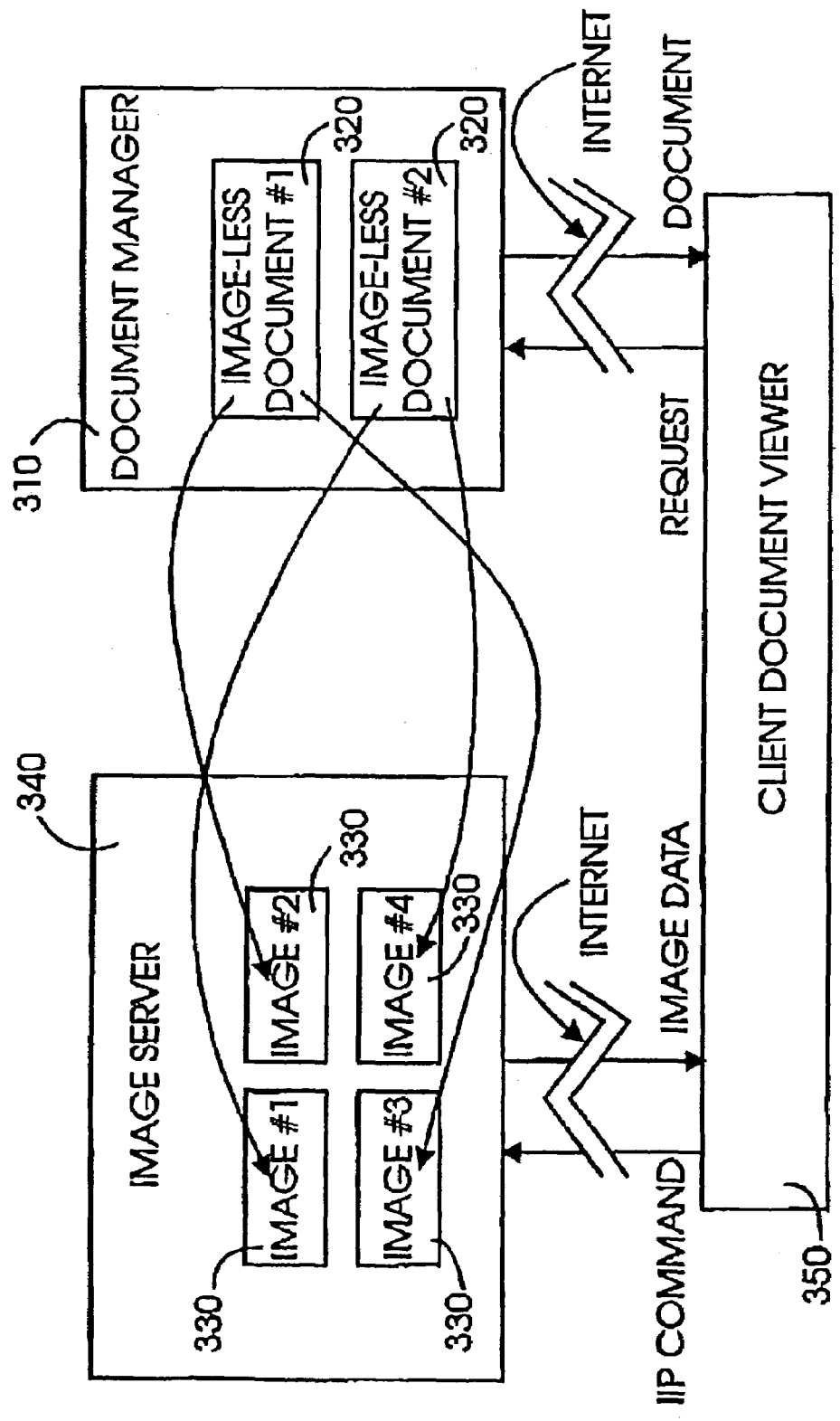
FIG. 3 is a simplified illustration of an Internet publishing system for publishing images over the Internet or any other suitable computer Network, in accordance with a preferred embodiment of the present invention.

Reference is now made to FIG. 3 which is a simplified illustration of an Internet publishing system of the present invention for publishing images over the Internet or any other suitable computer network in accordance with a preferred embodiment of the present invention. An electronic document management system 310 contains several documents 320. Documents 320 are image-less documents, obtained by removing some or all of the images within an original document, and substituting references thereof.

In accordance with a preferred embodiment of the present invention, the images selected to be removed from an original document are those images contained within the original document that are larger than a prescribed size. Each document typically contains text characters, page layout information, font references and references to raster images 330 in the form of links. Image-less document #1 contains links to image #2 and image #3. Image-less document #2 contains links to image #1 and image #4. The raster images 330 are stored on one or more image servers 340. A document viewer 350 accesses image-less document #1 via an Internet connection. Document viewer 350 may be part of a web browser or, alternatively, it may be auxiliary client software.

When document viewer 350 initially accesses a requested document, document manager 310 transmits image-less document #1. Document viewer 350 initially requests from image server 340 screen resolution versions of each image that is missing from image-less document #1, by means of an IIP request, generates an initial default page of the requested document with screen resolution images embedded therewithin, and displays the initial default page. Alternatively, document viewer 350 may initially request from image server 340 screen resolution versions of only those images that actually appear within the initial page that is displayed, and may request additional images as they are needed to satisfy subsequent user requests. Document viewer uses the references embedded within document #1 to identify the IP address of the appropriate image server and the path and file name for the files containing the appropriate image data. The images referenced in document #1 may reside on a single image server, or alternatively, some of the images may reside on different image servers than others of the images.

The IIP request used to request image data may include a server-side processing command, such as a CVT command. Alternatively, it may include a client-side processing command, such as the TIL command. In the latter case, document viewer 350 combines the image tiles it receives into a single display.

A user interactively views the requested document by advancing back and forth through pages, by zooming in and out of a page, and by navigating within the page. Interactive user requests for viewing the requested document initiate corresponding IIP requests for specific images or image portions that are transmitted from document viewer 350 to image server 340. Image server 340 transmits the requested image data to document viewer 350. Document viewer 350 then embeds the image data into image-less document #1 and displays the requested page or portion of a page with images embedded therewithin.

Figure 4A:
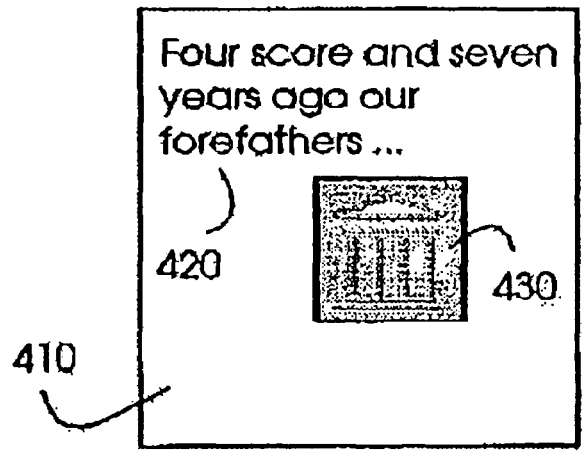
FIGS. 4A, 4B and 4C are simplified illustrations of a page with text and images from a scalable document as seen at various display resolutions, in accordance with a preferred embodiment of the present invention.
Figure 4B:
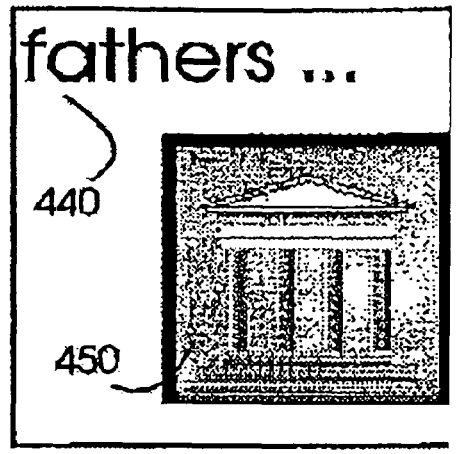
Figure 4C:
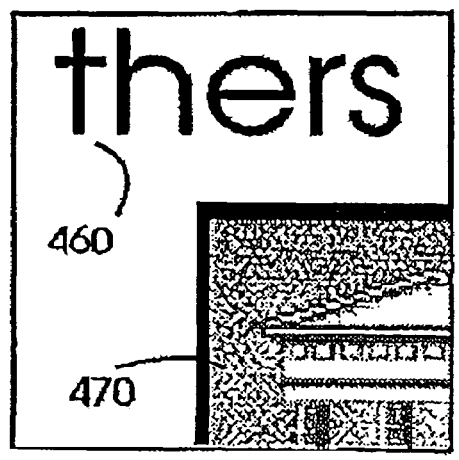

Reference is now made to FIGS. 4A-4C which are simplified illustrations of a page containing text and images from a scalable document as seen at various display resolutions, in accordance with a preferred embodiment of the present invention. A scalable document 410 is accessed by a client and displayed using an initial default view, as shown in FIG. 4A The page contains font text data 420 and a raster image 430.

A user interactively views scalable document 410 and may zoom in on a portion of the page. The scalable document is automatically re-scaled so that both the text 440 and the image 450 are enlarged, as shown in FIG. 4B. The user may further zoom in on a portion of the page, and the scalable document is automatically re-scaled again so that both the text 460 and the image 470 are further enlarged, as shown in FIG. 4C. In an alternative embodiment of the present invention, the image can be opened in a separate window in the viewer, and interactively viewed within the separate window.

Figure 5:
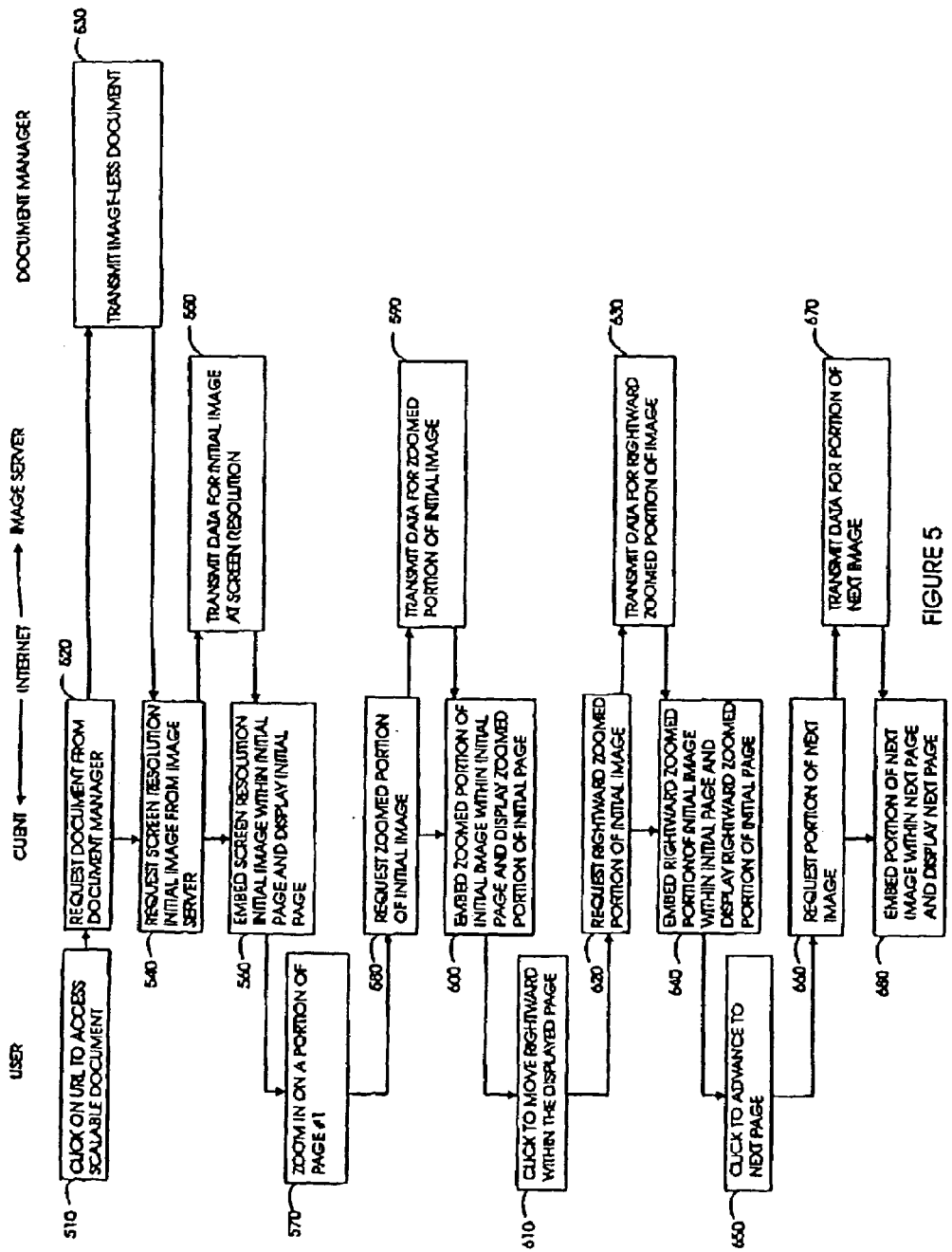
FIG. 5 is a simplified flowchart of the operation of operation of a document viewer in accordance with a preferred embodiment of the present invention.

Reference is now made to FIG. 5, which is a simplified flowchart of operation of a document viewer in accordance with a preferred embodiment of the present invention. Illustrated in FIG. 5 is a sample interactive viewing session during which a client interactively views a document containing a high quality image stored on a server computer. In the sample session illustrated a user views an initial page of the document with an image. The user clicks to zoom in on the page, then navigates to move to the right and then advances to a next page.

At step 510 a user clicks on a URL for a document file in a web page. At step 520 the user's client computer issues a request to a document manager for the document file. At step 530 the document manager transmits the requested document to the client as an image-less document.

At step 540 the client computer requests from the image server an initial image at a screen resolution. Such a request is preferably an IIP request. The IIP request may be a server-side processing request containing a CVT command, requesting a specific image portion at a specific image resolution. In this case the image server carries out the necessary image processing to return a single image corresponding to the image portion and pixel resolution requested by the client computer. Alternatively, the IIP request may be a client-side processing request containing one or more TIL commands, requesting specific image tiles from specific resolution layers. In this case the image server fetches and transmits the desired tile data, and the client computer is responsible for handling the image tiles it receives. If the image data is not stored in an MRT file format, then the server must perform on-the-fly processing to generate tiles in all but the highest resolution layer.

At step 550 the image server transmits data for the screen resolution version to the client computer. As mentioned hereinabove, the transmitted image data may comprise a single image portion, or alternatively it may comprise a plurality of image tiles. At step 560 the client computer receives the transmitted image data, embeds the screen resolution image into an initial page of the document, and displays the initial page with the screen resolution image embedded. If the transmitted image data consists of a plurality of image tiles, then at step 560 the client computer may also process the image tiles to combine them together into a single image portion. Alternatively, the client computer may embed the tiles individually into the initial page of the document, without first combining them together.

At step 570 the user, while viewing the initial page of the document, clicks to zoom in on a portion of the displayed page. The zoom can be activated, for example, by the user clicking on an icon such as a magnifying glass, or by clicking at a location within the page, or both. At step 580 the client computer requests from the image server an appropriate zoomed portion of the initial image, corresponding to the zoomed portion of the page to be displayed. As mentioned hereinabove, such request may include a server-side processing command, such as the IIP CVT command, or alternatively it may include a client-side processing command, such as the IIP TIL command. At step 590 the image server transmits data for the zoomed portion of the initial image to the client computer. At step 600 the client computer receives the transmitted image data, embeds the zoomed portion of the initial image into the initial page of the document, and displays the zoomed portion of the initial page that was requested. As mentioned hereinabove, at step 600 the client computer may also process the transmitted image data in order to combine image tiles.

At step 610 the user, while viewing the zoomed portion of the initial page, clicks to move rightward within the displayed page. Since the client computer displays only a portion of the initial document page, the user must navigate to see other portions of this page. At step 620 the client computer requests from the image server an appropriate zoomed portion of the initial image, corresponding to the rightward zoomed portion of the initial page. At step 630 the image server transmits data for the rightward zoomed portion of the initial image to the client computer. At step 640 the client computer receives the transmitted image data, embeds the rightward zoomed portion of the initial image into the initial page of the document, and displays the rightward zoomed portion of the initial page that was requested.

At step 650 the user, while viewing the rightward zoomed portion of the initial page, clicks to advance to the next page within the document In the embodiment illustrated in FIG. 5, the next page appears at the same portion and zoom factor as the current page. However, it should be apparent to those skilled in the art that other choices can be implemented, such as resetting the view of the next page to the default view of the first page At step 660 the client computer requests an appropriate portion of the next image from the image server. At step 670 the image server transmits data for the zoomed portion of the next image to the client computer. At step 680 the client computer receives the transmitted image data, embeds the zoomed portion of the next image into the next page of the document, and displays a portion of the next page.

Caching

The present invention uses caching in order to achieve improved performance. One of the advantages of client-side processing over server-side processing is the ability to cache responses. As described above, client-side processing operates by transmitting individual tiles from the server to the client, and these tiles can be cached by the client as they are received, thereby obviating the need to transmit them again. The tile cache can be built up on the client, and as each additional interactive navigational request is processed, the client can determine which tiles among the tiles necessary to fulfill the request are already present in cache, and request from the server only those tiles that are not available. Thus, for example, when a user pans slightly to the right, only the newly exposed tiles have to be transmitted from the server to the client.

The success of caching stems from the fact that a user interactively navigating through a large image typically returns to the same image data in a recurrent fashion. Zooming in and out, and panning up, down, left and right, typically lead through some of the same image data. This phenomenon is atypical for media such as video for which the usual viewing mode is simply to play the frames of the video forward, and the same data is usually not accessed more than once in a single session.

Image-Less Documents

The image-less documents of the present invention are created by means of a fragmenting tool that converts a standard document containing images, such as a document in the portable document format (PDF) of Adobe Systems, Inc., into an image-less document. The fragmenting tool operates by (i) extracting raster images embedded within the standard document, (ii) storing the raster images on an image server, and (iii) replacing the raster images with references to the stored images, and inserting the references into the document.

When such an image-less document is viewed interactively by navigation, the raster images referenced in the pages of the document are embedded at an appropriate scale. When such an image-less document is printed or saved at a specified dpi resolution, the raster images referenced in the pages of the document are embedded at an appropriate scale. In a preferred embodiment of the present invention, when a user saves a document, he can select a desired resolution for the save operation. Upon save, the image-less document is converted back to a standard document with raster images, rather than references, embedded therewithin at the user-specified resolution. Similarly, in a preferred embodiment of the present invention, when a user prints a document, the document is converted back to a standard document with raster images embedded at the resolution appropriate to the output device, and then sent to the output device.

The conversion back from an image-less document to a standard document is performed by means of a composing tool. The composing tool reverses the operations performed by the fragmenting tool, and operates by (i) accessing the images stored on the image server to produce appropriately scaled images, (ii) removing the references to the stored images from the image-less document, and (iii) embedding the appropriately scaled images into the document.

Figure 6:
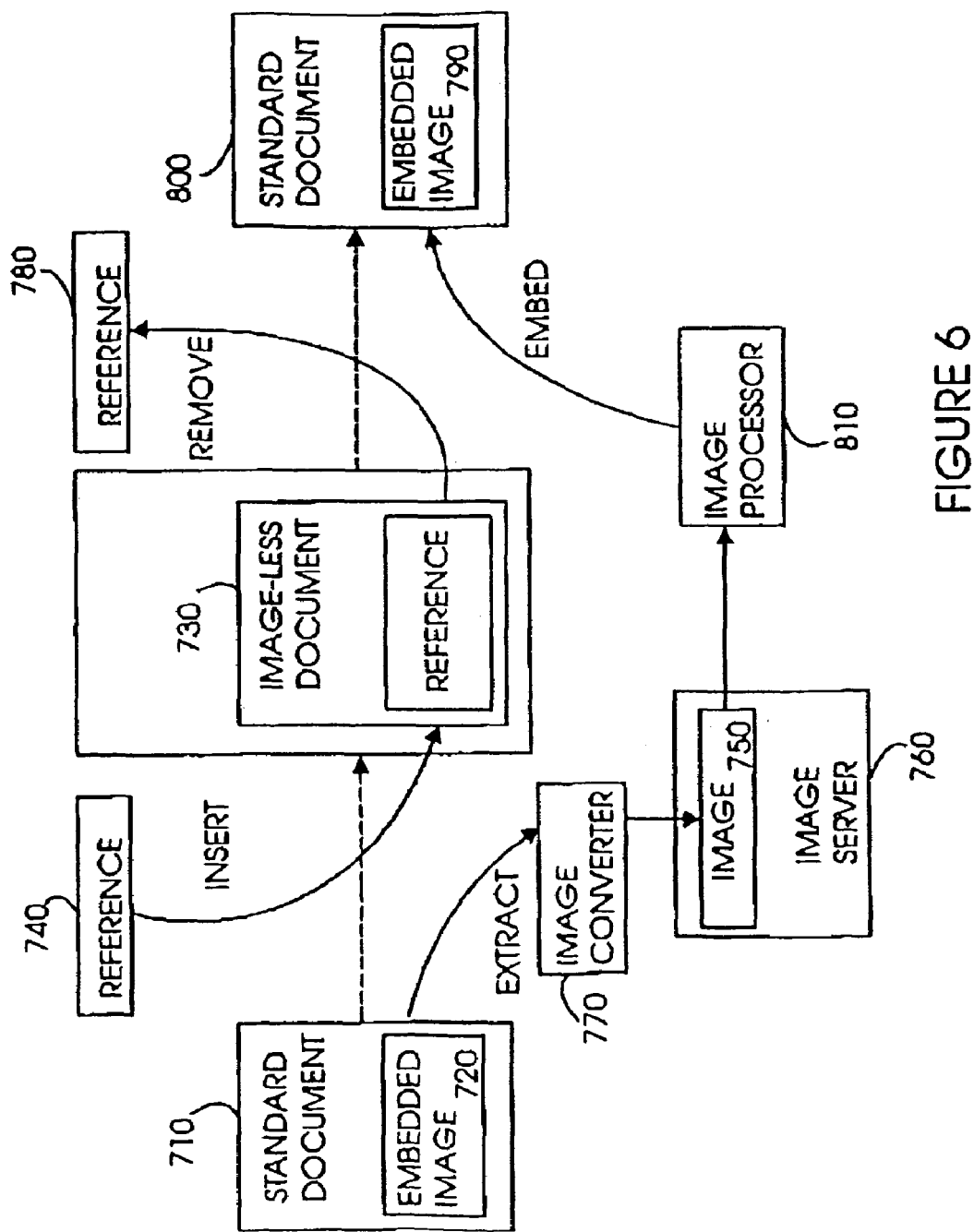
FIG. 6 is a simplified illustration of a fragmenting tool for converting standard documents to image-less documents, and a composing tool for converting image-less documents to standard documents.

Reference is now made to FIG. 6, which is a simplified illustration of a fragmenting tool for converting standard documents to image-less documents, and a composing tool for converting image-less documents to standard documents. FIG. 6 illustrates a fragmenting tool that converts a standard document 710, such as a PDF document, containing an embedded image 720, into an image-less document 730. To achieve scalability, image 720 is extracted from standard document 710 and replaced with a reference 740. Embedded image 720 is stored as an image file 750 on an image server 760, and reference 740 refers to image file 750. Image file 750 may be a Flashpix image file, obtained from embedded image 720 by means of converter unit 770.

Conversely, as described above, for print and save operations it is necessary to generate a standard document, such as a PDF document, from an image-less document. FIG. 6 also illustrates a composing tool that converts image-less document 730 into a standard document 800 by using a reference 78,0 contained within image-less document 730. Reference 780 refers to stored image data, such as image file 750. To accomplish the conversion, reference 780 is removed from image-less document 730 and image 790 is embedded in its stead, to produce a standard document 800. Embedded image 790 is generated from image file 750 by image processor 810, to produce an image at the appropriate resolution for the printer or at the resolution specified by the user for saving. As such, embedded image 790 may be at a different resolution than embedded image 720.

It should be appreciated by those skilled in the art that when converting image-less document 730 to standard document 800, reference 780 may be located external to image-less document 730. In such a case it is unnecessary to remove reference 780 from image-less document 830. Image processor 810 generates embedded image 790 from stored image 750, and then image 790 is embedded into standard document 800.

Pre-Press Applications

An important application of the present invention is pre-press graphic arts. A server computer stores a print job in the form of a document that contains high resolution images. A client proofs the job by interactively viewing the document and marking edits in the form of a job ticket. Use of the present invention allows a client to proof a job that includes high resolution images, without the need to transmit the entire job file, images included, back and forth between the server and the client. Typically images used in pre-press applications are of very high quality, and their transmission requires a great deal of memory and bandwidth.

Figure 7:
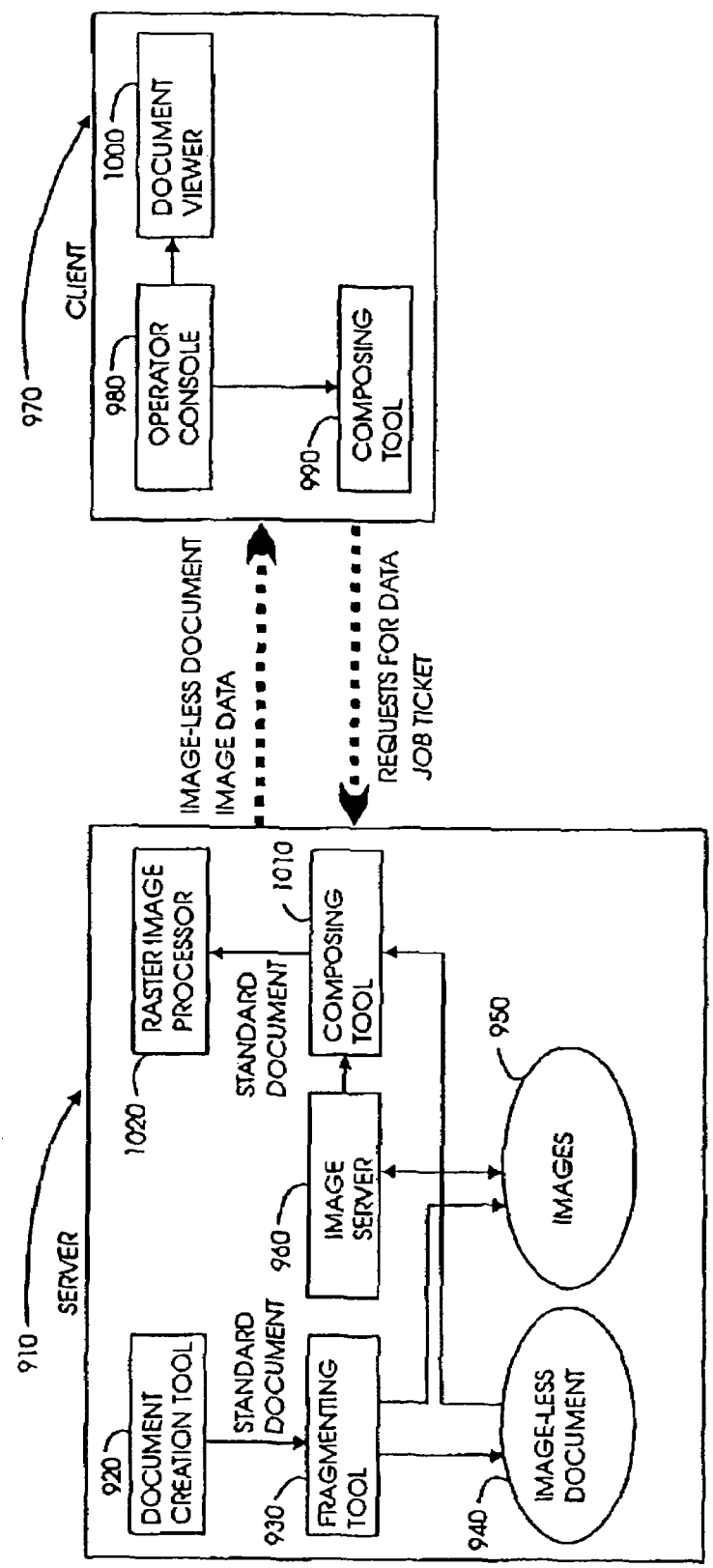
FIG. 7 is a simplified schematic diagram of a pre-press application employing a preferred embodiment of the present invention.

Reference is now made to FIG. 7, which is a simplified schematic diagram of a pre-press application employing a preferred embodiment of the present invention. A server 910 stores an original document containing high quality images therewithin. Such a document can be created by a document creation tool 920, such as Adobe FrameMaker or QuarkXpress. Server 910 may be a raster image processing (RIP) engine, such as a controller for a color copier as described hereinabove.

The original document is then processed by a fragmenting tool 930, such as that described hereinabove with reference to FIG. 6, which separates out the images from the document and replaces them with references. Fragmenting tool 930 produces two products: an image-less document 940, and at least one high resolution image 950. Image 950 is managed by image server 960.

Image-less document 940 is the document that is transmitted to a client 970 for proofing. In one embodiment of the present invention, client 970 is a customer computer. In another embodiment of the present invention, client 970 is a management console for a RIP system, such as a controller for a color copier, as described hereinabove. For the sake of clarity and conciseness, the subsequent description relates to the embodiment wherein a customer proofs his job using a customer computer.

The customer receives image-less document 940 on client computer 970, together with screen resolution versions of image 950. An operator console 980 including a client user interface allows the customer to view the document and the images on a video display interactively, by zooming in and out of the pages and by panning through various portions of the pages. Corresponding to each interactive request to view a portion of a page, client 970 issues IIP requests to server 910 for appropriate image data. Such requests may include server-side processing commands, such as the CVT command described hereinabove, or client-side processing commands, such as the TIL command described hereinabove, or a combination of both server-side and client-side processing commands.

As the customer interactively views and proofs the document on the video display, he marks changes and corrections in a "job ticket." A job ticket is a file, such as an Adobe PDF job ticket, that records the changes and corrections desired by the customer.

When image data corresponding to image 950, or to portions of image 950, at specific resolutions is transmitted from server 910 to client 970, a client composing tool 990, such as that described hereinabove with reference to FIG. 6, inserts the image 950 or portions of image 950 into the image-less document, and a document viewer 1000 then displays a document page, or a desired portion of a document page, at a desired resolution on the video display.

When the customer has finished proofing a document and has recorded his changes and corrections in the job ticket, the job ticket is transmitted from client 910 to server 910. After server 910 receives the customer job ticket, it makes the indicated changes and corrections, and a notification is sent to the customer to re-proof his modified job for final approval. Alternatively, the customer's re-proofing of the job can be bypassed under appropriate circumstances.

After a job has been proofed and corrected, and is ready for a full production run, modified image-less document and modified images are combined within a server composing tool 1010 to form a standard document The resulting standard document is then delivered to a raster image processor 1020 and printed on an appropriate output device.

In reading the above description, persons skilled in the art will realize that there are many apparent variations that can be applied to the methods and systems described. As one such variation, regarding the image file formats, the images extracted from an original document in generating an image-less document may be embodied in one or more of several standard image formats such as BMP, Flashpix, JPEG, PNG, GIF or TIF, or in one or more non-standard image formats. Similarly, the images extracted from an original document may be stored in one or more of several standard image formats, or in non-standard image formats, and this may entail converting the images from a first format in which they were extracted to a second format in which they are stored.

Additionally, regarding the data transmission protocols, transmission of image-less documents and image data over the Internet between a server and a client can be performed according to one of several Internet protocols, such as Hyper-Text Transfer Protocol (HTTP).

Additionally, screen resolution images can be embedded within an image-less document, together with references to stored images, so that when an image-less document is received it can be immediately displayed at an initial screen resolution scale, without the need to download separate image data When a user zooms in on such a document, zoomed image portions are downloaded and substituted for the initial screen resolution images.

Additionally, a server can stream additional image data while a client is viewing a document, without the client specifically requesting such additional image data. That is, rather than have the image data transmission may be partially or completely server-driven, of "pull" nature. When the image data transmission is partially client-driven and also partially server-driven client requests preferably are given priority over and pre-empt transmission of "pushed" data. When the image data transmission is completely server-driven, the client is restricted in interactively viewing the document to the extent that the necessary data has already been delivered.

Additionally, the image-less document transmitted from a server to a client may be transmitted in separate pages, each page being delivered upon request by the client, rather than transmitting the entire document at once.

Additionally, a server may enforce access control, requiring a client to be authenticated (e.g. with a username and password) before delivering a document or image data. Such access control ensures that a user cannot access someone else's job.

Additionally, a server may include various auxiliary document management features, such as indexing and searching capabilities.

Additionally, with reference to FIG. 5, an initial view of the document can include one or more thumbnails, each thumbnail corresponding to one of the document pages.

Additionally, with reference to FIG. 5, when a user clicks on an image within a document, the image may be displayed in its own separate window, instead of or in addition to being displayed within the document page. The user can then interactively inspect the image in the separate window by zooming in and out of the image, and by panning through the image in several directions. Use of a separate window for inspecting images offers a way to focus on the image itself, independent of the document page in which it is contained.

Additionally, with reference to FIG. 7, an on-line proofing system may enable a customer to make his own changes and corrections, rather than mark them in a job ticket and send the job ticket back to the server.

It will be appreciated by persons skilled in the an that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

The invention claimed is:

1. A method executed in a system for on-line proofing of a document containing an image, wherein an original document on which the document to be proofed is based also contains content other than an image, the method comprising the operations of:

sending, by a client computer, a document request to a document server computer;

transmitting a document corresponding to the document request from the document server computer to the client computer in response to the document request, the document having a reference to an image;

sending, by the client computer, an image data request to an image server computer based on the reference to the image;

transmitting an image corresponding to the reference from the image server computer to the client computer in response to the image data request;

combining, by the client computer, the document transmitted by the document server with the image transmitted by the image server;

proofing, by the client computer, the combined document;

recording, by the client computer, desired changes and/or corrections to the combined document without recording the combined document into a job ticket based on the proof processing in said proofing step;

sending, by said client computer, the job ticket to the document server computer;

making, by the document server computer, the desired changes and/or corrections recorded in the job ticket to the document and the image respectively to obtain a modified document and a modified image; and combining, by the document server computer, the modified document with the modified image.

2. The method according to claim 1, wherein the image data request includes a size corresponding to a desired width and height of the image.

3. The method according to claim 1, wherein the image data request is based on a requested rectangular portion of an image.

4. The method according to claim 1, wherein the document corresponding to the document request transmitted by the document server is generated from an original document file by removing at least one image within the original document file and storing the at least one image in at least one file, the at least one file being distinct from the original document file.

5. A system for on-line proofing of a document containing an image, wherein an original document on which the document to be proofed is based also contains content other than an image, the system comprising:

a client computer, comprising:
document request means for sending a document request to a document server computer;
document receiving means for receiving a document corresponding to the document request from the document server computer, the document having a reference to an image;
image data request means for sending an image data request to an image server computer based on the reference to the image;
image data receiving means for receiving an image corresponding to the reference from the image server computer;
first combining means for combining the received document with the received image;
proofing means for proofing the combined document;
recording means for recording desired changes and/or corrections to the combined document without recording the combined document into a job ticket based on the proof processing by the proofing means; and
transmitting means for sending the job ticket to the document server computer;

a document server computer, comprising:
document request receiving means for receiving the document request from the client computer;
document transmitting means for transmitting the document corresponding to the document request to the client computer;
job ticket receiving means for receiving the generated job ticket from the client computer;
modification means for making the desired changes and/or corrections recorded in the job ticket to the document and the image respectively to obtain a modified document and a modified image; and second combining means for combining the modified document with the modified image; and an image server computer, comprising:
image data request receiving means for receiving the image data request from the client computer; and
image transmitting means for transmitting the image corresponding to the image data request to the client computer.

6. The system according to claim 5, wherein the image data request includes a size corresponding to a desired width and height of the image.

7. The system according to claim 5, wherein the image data request is based on a requested rectangular portion of an image.

8. The system according to claim 5, wherein the document corresponding to the document request transmitted by the document server is generated from an original document file by removing at least one image within the original document file and storing the at least one image in at least one file, the at least one file being distinct from the original document file.

9. A method executed by a client computer in a system for on-line proofing of a document containing an image, wherein an original document on which the document to be proofed is based also contains content other than an image, the method comprising the steps of:

sending, by the client computer, a document request to a document server computer;

receiving, by the client computer, a document corresponding to the document request from the document server computer, the document having a reference to an image;

sending, by the client computer, an image data request to an image server computer based on the reference to the image;

receiving, by the client computer, an image corresponding to the reference from the image server computer;

combining, by the client computer, the received document corresponding to the document request with the received image;

proofing, by the client computer, the combined document;

recording, by the client computer, desired changes and/or corrections to the combined document without recording the combined document into a job ticket based on the proof processing by the proofing step; and sending, by the client computer, the job ticket to the document server computer for causing the document server computer to make the desired changes and/or corrections recorded in the job ticket to the document and the image respectively to obtain a modified document and a modified image, and to combine the modified document with the modified image.

10. The method according to claim 9, wherein the image data request includes a size corresponding to a desired width and height of the image.

11. The method according to claim 9, wherein the image data request is based on a requested rectangular portion of an image.

12. The method according to claim 9, wherein the document corresponding to the document request received from the document server is generated from an original document file by removing at least one image within the original document file and storing the at least one image in at least one file, the at least one file being distinct from the original document file.

13. A client computer apparatus in a system for performing on-line proofing of a document containing an image, wherein an original document on which the document to be proofed is based also contains content other than an image, the client computer apparatus comprising:

document request transmitting means for sending a document request to a document server computer;

document receiving means for receiving a document corresponding to the document request from the document server computer, the document having a reference to an image;

image date transmitting means for sending an image data request to an image server computer based on the reference to the image;

image receiving means for receiving an image corresponding to the reference from the image server computer;

combining means for combining the received document with the received image;

proofing means for proofing the combined document;

recording means for recording desired changes and/or corrections to the combined document without recording the combined document into a job ticket based on the proof processing by the proofing means; and job ticket transmitting means for sending the job ticket to the document server computer for causing the document server computer to make the desired changes and/or corrections recorded in the job ticket to the document and the image respectively to obtain a modified document and a modified image, and to combine the modified document with the modified image.

14. The apparatus according to claim 13, wherein the image data request includes a size corresponding to a desired width and height of the image.

15. The apparatus according to claim 13, wherein the image data request is based on a requested rectangular portion of an image.

16. The method according to claim 13, wherein the document corresponding to the document request received from the document server is generated from an original document file by removing at least one image within the original document file and storing the at least one image in at least one file, the at least one file being distinct from the original document file.

17. A computer-readable medium on which is stored a computer-executable program that executes a method by a client computer in a system for on-line proofing of a document containing an image, wherein an original document on which the document to be proofed is based also contains content other than an image, the method executed by the client computer comprising the steps of:

sending a document request to a document server computer;

receiving a document corresponding to the document request from the document server computer, the document having a reference to an image;

sending an image data request to an image server computer based on the reference to the image;

receiving an image corresponding to the reference from the image server computer;

combining the received document with the received image;

proofing the combined document;

recording desired changes and/or corrections to the combined document without recording the combined document into a job ticket based on the proof processing in the proofing step; and sending the job ticket to the document server computer for causing the document server computer to make the desired changes and/or corrections recorded in the job ticket to the document and the image respectively to obtain a modified document and a modified image, and to combine the modified document with the modified image.

18. The computer-readable medium according to claim 17, wherein the image data request includes a size corresponding to a desired width and height of the image.

19. The computer-readable medium according to claim 17, wherein the image data request is based on a requested rectangular portion of an image.

20. The computer-readable medium according to claim 17, wherein the document corresponding to the document request received from the document server is generated from an original document file by removing at least one image within the original document file and storing the at least one image in at least one file, the at least one file being distinct from the original document file.

* * * * *